(12) United States Patent
Robinson

(10) Patent No.: US 6,272,526 B1
(45) Date of Patent: Aug. 7, 2001

(54) DISTRIBUTED PROCESSING SYSTEMS HAVING SELF-ADVERTISING CELLS

(75) Inventor: Jeffrey I. Robinson, New Fairfield, CT (US)

(73) Assignee: iQ NetSolutions, Inc., Westborough, MA (US)

( * ) Notice: Subject to any disclaimer, the term of this patent is extended or adjusted under 35 U.S.C. 154(b) by 0 days.

(21) Appl. No.: 09/227,005

(22) Filed: Jan. 7, 1999

(51) Int. Cl.[7] .................................................. G06F 15/16
(52) U.S. Cl. ......................... 709/201; 709/203; 709/208
(58) Field of Search ................................... 709/201, 203, 709/208

(56) References Cited

U.S. PATENT DOCUMENTS

| | | |
|---|---|---|
| 4,791,550 | 12/1988 | Stevenson et al. . |
| 5,005,122 * | 4/1991 | Griffin et al. . |
| 5,036,459 | 7/1991 | den Haan et al. . |
| 5,095,522 | 3/1992 | Fujita et al. . |
| 5,165,018 | 11/1992 | Simor . |
| 5,241,673 | 8/1993 | Schelvis . |
| 5,398,336 | 3/1995 | Tantry et al. . |
| 5,430,850 | 7/1995 | Papadopoulos . |
| 5,550,976 | 8/1996 | Henderson et al. . |
| 5,790,788 * | 8/1998 | Badovinatz et al. ................. 709/201 |
| 5,920,691 * | 7/1999 | Tsutsui et al. ........................ 709/201 |
| 5,999,712 * | 12/1999 | Moiin et al. ...................... 395/200.5 |
| 5,999,964 * | 12/1999 | Murakata et al. ................... 709/201 |
| 6,047,310 * | 4/2000 | Kamakura et al. .................. 709/201 |
| 6,047,311 * | 4/2000 | Ueno et al. ......................... 709/202 |
| 6,055,363 * | 4/2000 | Beals et al. ......................... 709/201 |

OTHER PUBLICATIONS

Article, "Distributed Operating Systems Combine Multiple Processors int a single machine", by Richard Quinell, EDN, Sep. 28, 1995, pp. 39–44.

* cited by examiner

Primary Examiner—Krisna Lim
(74) Attorney, Agent, or Firm—David P. Gordon; David S. Jacobson; Thomas A Gallagher

(57) ABSTRACT

A distributed processing system includes a plurality of cells where each cell processes information in response to a type of event, and cells communicate with each other according to an (asynchronous) event-reaction protocol. According to one embodiment, each cell is responsive to a single type of event and includes a plurality of scripts which are executed upon the occurrence of an event of the appropriate type. At least some scripts include directions to send information to one or more scripts in another cell. According to another embodiment, some cells communicate with other cells according to a (synchronous) streaming protocol and other cells communicate according to an (asynchronous) event-reaction protocol. The cells communicate with each other via a shared memory or via a communications bus. The communications protocol utilized by the cells enables the use of virtually any networking medium. Thus, cells may reside in the same chip or may be separated from each other by thousands of miles.

20 Claims, 7 Drawing Sheets

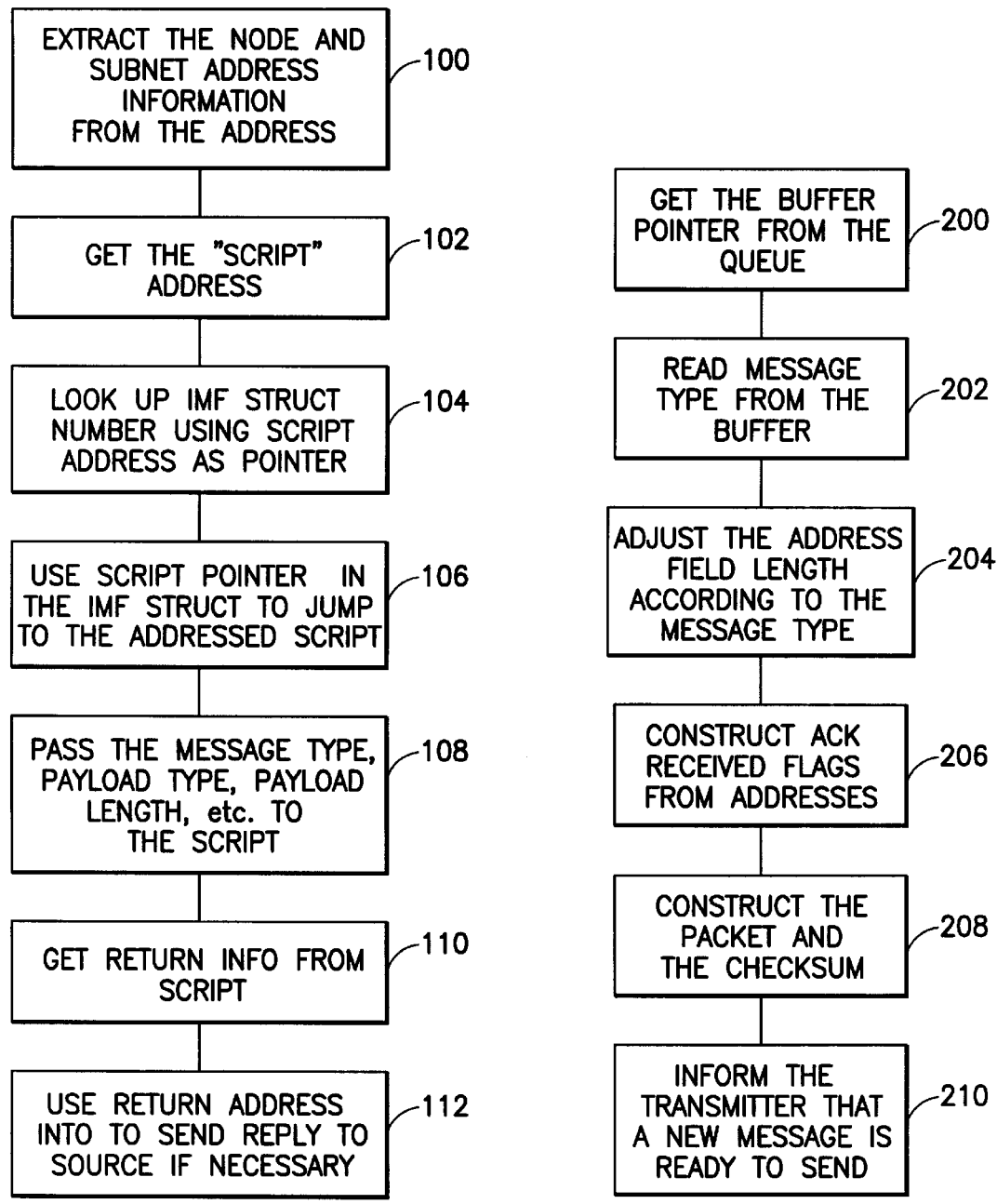

DISTRIBUTED PROCESSING SYSTEMS HAVING SELF-ADVERTISING CELLS

This application is related to Ser. No. 09/004,174, U.S. Pat. No. 6,052,729 filed Jan. 7, 1998, and entitled "Event-Reaction Communication Protocol in an Object Oriented Processor Array", now U.S. Pat. No. 6,052,729, issued Apr. 18, 2,000 the complete disclosure of which is hereby incorporated by reference herein.

BACKGROUND OF THE INVENTION

1. Field of the Invention

The invention relates to distributed processing systems. More particularly, the invention relates to distributed processing systems which incorporate a plurality of processing zones (referred to herein as "cells"), each cell processing information in response to a type of event, and each cell communicating with other cells according to an event-reaction protocol as well as according to other protocols such as streaming, broadcast, etc. Cells exhibit a symmetrical and reciprocal relationship, with cells sometimes being a controller of other cells and sometimes being controlled by other cells. The system is self-configuring, self-repairing, and operates in real time.

2. State of the Art

So-called "distributed processing" or "parallel processing" systems generally employ multiple processors in order to speed the execution of a single program or to enable the simultaneous execution of several programs. Distributed processing embraces almost any computing system where processing of data occurs in more than one CPU. A simple example of distributed computing is printing from a PC to an image processing printer which has its own processor. The task of printing is distributed between the processor in the PC and the processor in the printer. In almost every case of "distributed processing" or "parallel processing" the distribution of tasks is controlled by a central controller processor. Thus, while processing may be distributed, "intelligence" is not distributed. The "intelligence" to decide how processes will be distributed remains centralized and limited.

U.S. Pat. No. 5,095,522 to Fujita et al. discloses an object-oriented parallel processing system which utilizes "concept objects" and "instance objects". The system utilizes a host processor and a plurality of general purpose processors which are programmed by the host processor. The host user must program (generate concept and instance objects) for each processor before parallel processing can begin. Fujita et al. considers this aspect of their system to be a feature which allows dynamic changes in the functionality of each of the processors. However, this aspect of their system greatly complicates the host processor software.

Similarly, U.S. Pat. No. 5,165,018 to Simor describes a system in which "nodes" are provided with generic configuration rules and are configured at runtime via resource definition messages from the control node. Simor considers this aspect of his system to be an advantage which, among other things, "isolates the hardware from the software" and "allows programs to be written as if they were going to be executed on a single processor." In addition, Simor's system permits programs to be "distributed across multiple processors without having been explicitly designed for that purpose."

Both Fujita et al. and Simor utilize general purpose processors and attempt to isolate the hardware from the software, freeing the programmer to write code as if it were being executed on a single processor. However, as mentioned above, writing multithreaded software for a single processor is very complex. Neither Fujita et al. nor Simor offer any solution for this complexity.

3. Related Inventions

Co-owned prior application Ser. No. 08/525,948, now U.S. Pat. No. 5,708,838 approaches the problem of distributed processing in a manner which is completely different from that of either Fujita et al. or Simor. The system disclosed in the '948 application utilizes processors which have been pre-programmed with functionality for a specific purpose and thereby integrates hardware with software. The developer chooses specific hardware (object oriented processors) in a manner similar to choosing specific software objects. This approach requires that the developer be very aware of the hardware used in the system, but frees the developer from writing much of the code used to implement the system. Accordingly, the developer need only write a minimal amount of relatively high level code to link the pre-programmed object oriented processors which contain statically stored code for performing specific tasks and to parametrically program the processors where desired. This approach is based on the belief that writing and de-bugging code is more time consuming and more expensive than linking together processors which contain pre-written, pre-tested, bug-free code. This approach enables rapid system development, relieves the host processor of many scheduling tasks, simplifies de-bugging, enables cross-platform support, and allows software emulation of hardware devices, as well as providing other advantages.

Co-owned prior application Ser. No. 08/683,625, now U.S. Pat. No. 6,072,944, discloses a distributed processing system where one or more object oriented processors are embodied as a collection of components on a single ASIC chip. This related application includes an enhanced communication language where messages from one processor to another include source and destination addresses. This communication protocol can be said to be "event driven".

Co-owned prior application Ser. No. 09/004,174, now U.S. Pat. No. 6,052,729, discloses an object oriented processor array including a library of functional objects which are instantiated by commands through a system object and which communicate via a high level language. Communication is based on an "event-reaction" model. According to the event-reaction model, when a processor object has a message to send, it generates a data event which is registered with the target recipient of the message (usually the host). The target reacts to the event by allowing a variable amount of I/O exchange between the processor object and the target prior to an acknowledgement of the data event. According to one embodiment, until the data event is acknowledged, no other data event may be sent to the target. According to another embodiment, a fixed number of data events may be pending simultaneously. In one embodiment of a multi-node system, each node (each object oriented processor array) is aware of network traffic; and data events related to a particular target (host) receiver are registered with all nodes which have that receiver as a target as well as with the target. The number of data events which may be simultaneously pending at any time is determined by the target and known to each of the nodes. The target arbitrates the flow of messages based on the registration of data events.

SUMMARY OF THE INVENTION

It is therefore an object of the invention to provide a distributed processing system which is particularly well suited for processing information in real time.

It is also an object of the invention to provide a distributed processing system which is relatively easy to program.

It is another object of the invention to provide a distributed processing system which is self-configuring.

It is yet another object of the invention to provide a distributed processing system which is self-repairing.

It is also an object of the invention to provide a distributed processing system wherein additional processors added to the system are automatically integrated into the system.

In accord with these objects which will be discussed in detail below, the distributed processing system of the present invention includes a plurality of cells where each cell processes information in response to a type of event, and cells communicate with each other according to a variety of protocols including an (asynchronous) event-reaction protocol. Processing is truly distributed in that no cell is considered the system host or system controller. The cells exhibit a symmetrical and reciprocal relationship with cells sometimes being a controller of other cells and sometimes being controlled by other cells.

According to one embodiment of the invention, each cell is responsive to a single event and includes one or more scripts which are executed upon the occurrence of the event. At least some scripts include directions to send information to one or more scripts in another cell.

According to another embodiment of the invention, information exchanged between cells is categorized into the following types which are listed in descending order of priority: streams, data events, data event acks, spawn process, spawn process begun, spawn process ended, exception, and broadcast.

The cells of the invention may communicate with each other via a shared memory or via a communications bus. A scalable bandwidth bus such as that described in co-owned previous application Ser. No. 08/645,262, filed May 13, 1996, now U.S. Pat. No. 5,922,061, is an ideal communications path for the cells of the invention. However, the communications protocol utilized by the cells enables the use of virtually any networking medium. Thus, cells may reside in the same chip or may be separated from each other by thousands of miles. According to the invention, a collection of interacting cells is referred to as a colony, regardless of where the cells are located, and a collection of cells which are closely located, e.g. on the same board, are referred to as a node. The modularity and scalability of the processing systems of the invention is therefore based on collections of cells and collections of colonies. According to the invention, each cell may be embodied in hardware, software, or a combination of hardware and software. No cell or colony need be considered a "host".

In the preferred embodiments of the invention, each cell is provided with a collection of synchronous (non-colliding) scripts which respond to a single type of event. All scripts have addresses and the addresses of all of the scripts in the processing system are kept in a database by a resource manager script in each cell. Applications are created by linking available scripts via their respective addresses. As all scripts are driven by particular events, the code written for the distributed processing system of the invention does not require any explicit scheduling. The processing system is essentially self-scheduling and real time applications can run concurrently without interfering with each other.

According to one preferred aspect of the invention, scripts communicate with each other by dynamically compiling and tearing down mailing lists which are based on the occurrence of specific events. Thus, in response to one specific event, a responding script will communicate with one set of other scripts; whereas in response to a different event, the responding script will communicate with a different set of other scripts. Scripts subscribe to and unsubscribe from the mailing lists of other scripts based on the occurrence of different events.

According to another preferred aspect of the invention, cells advertise their presence in the network when connected, and periodically thereafter, in order that other cells be able to take advantage of their resources. In particular, each cell periodically (e.g. every second) updates its database of script addresses which represent the functionality of the system to accommodate the addition of new cells to the system and to accommodate for cells which have become disconnected from the system or which have stopped functioning for some reason. Thus, a processing system according to the invention is readily expanded to include new and additional processing resources which are substantially automatically assimilated into the system. The processing system is, in this sense, self-configuring and self-repairing.

According to another preferred aspect of the invention, communication among cells is effected with the aid of mailing lists such that data may be multicast from one cell to many cells. Moreover, the mailing lists are preferably dynamically set up and torn down depending on the execution of scripts which direct the flow of data throughout the system. Further, the mailing lists are updated as new cells are added to and old cells are removed from the system as part of the self-configuring and self-repairing functionality of the system.

An exemplary embodiment of a distributed processing system according to the invention is illustrated with reference to a telephone private branch exchange (PBX) in which cells are distributed over "line cards" and "phone cards" which couple several telephone sets to one or more telephone subscriber lines. In this example, the cells communicate with each other via the same physical medium through which the telephones are coupled to subscriber lines. Each line card and phone card is considered a node, each having a number of cells. Cells in the phone cards include, for example, cells responding to the following events: phone off hook, DTMF tone dialed, ring detected, etc. Examples of scripts executed in response to events include, generate dial tone, send ringing signal, seize subscriber line, etc. According to a preferred embodiment, each of the cards advertises its presence to the other cards on a regular basis. The knowledge of the presence of cards (nodes) in the system is used to build mailing lists when, for example, a conference call is made, or when the system is programmed so that only some phones in the system ring when an outside call is detected by a line card.

Additional objects and advantages of the invention will become apparent to those skilled in the art upon reference to the detailed description taken in conjunction with the provided figures.

BRIEF DESCRIPTION OF THE DRAWINGS

FIG. 4 is a flow chart illustrating the processing of messages by a network interface receiver cell;

FIG. 5 is a flow chart illustrating the processing of messages by a network interface transmitter cell;

BRIEF DESCRIPTION OF THE APPENDIX

The Appendix is a collection of program listings in C language source code for implementing the PBX described herein.

DETAILED DESCRIPTION OF THE PREFERRED EMBODIMENTS

Figure 1:
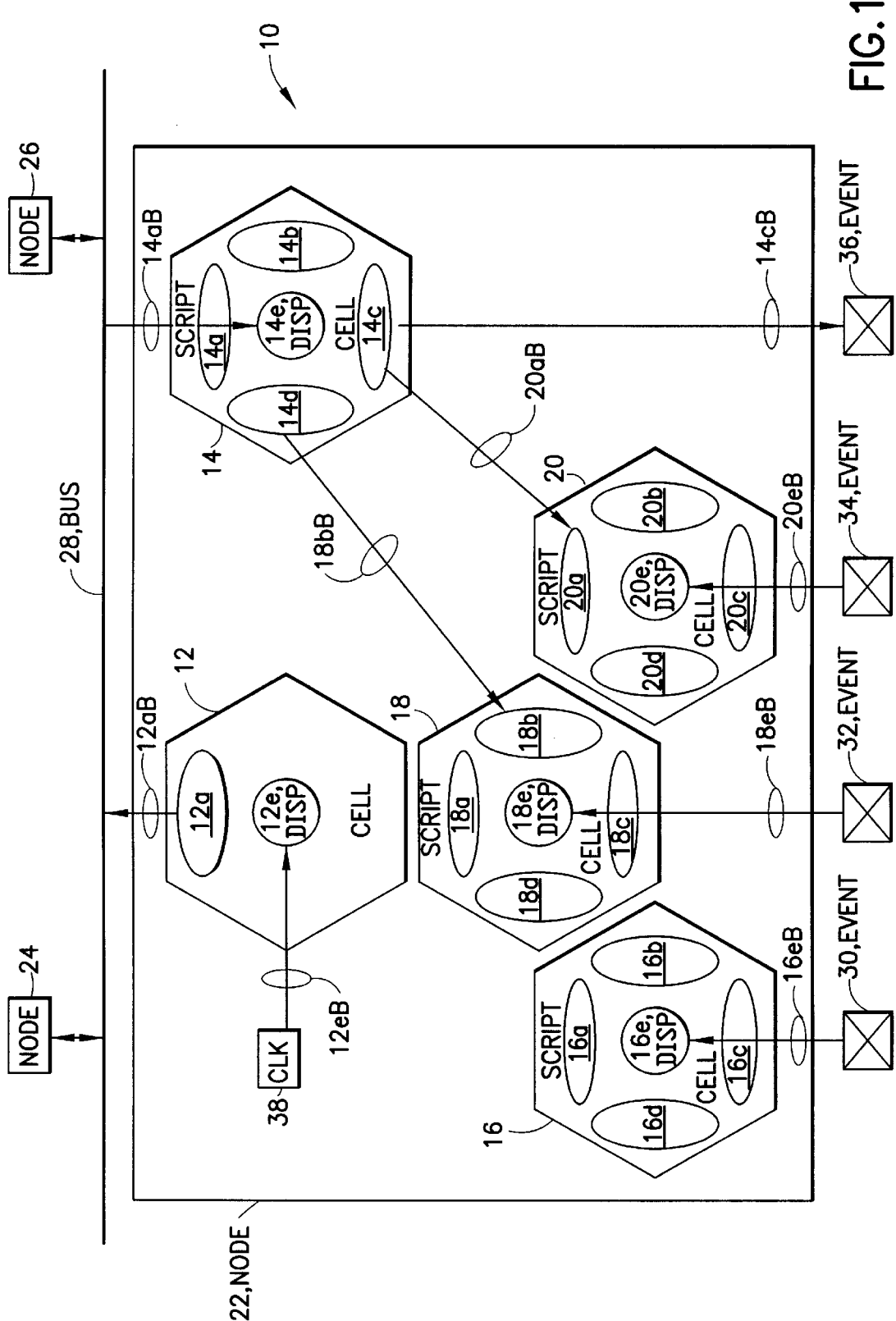
FIG. 1 is a high level schematic diagram of a local node of cells coupled to two remote nodes via an external bus.

Referring now to FIG. 1, a distributed processing system 10 according to the present invention includes a plurality of cells, e.g. 12, 14, 16, 18, 20. Each cell is responsive to a particular event and responds to the event by executing one or more scripts. For purposes of illustration, the cells 14, 16, 18, 20 shown in FIG. 1 are each depicted as having four executable scripts 14a–d, 16a–d, 18a–d, 20a–d. For reasons explained below, the cell 12 has only one script 12a. Further, for purposes of illustration, each cell is shown to have a "dispatcher" 12e, 14e, 16e, 18e, 20e which interprets the event and causes scripts to be executed in response to the event. The cells 12, 14, 16, 18, 20 shown in FIG. 1 are related to each other spatially and are conveniently referred to as a "node" which is delineated by the box 22. The cells 12, 14, 16, 18, 20 in the node 22 are coupled to each other by either a bus or a shared memory or other communications means which is described in more detail below with reference to FIG. 2. As shown schematically in FIG. 1, data enter and leave cells via buffers 12aB, 12eB, 14aB, 14cB, 16eB, 18bB, 18eB, 20aB, 20eB. The spatially related cells in node 22 may be coupled to cells in other remote nodes 24, 26 by way of an external bus 28. As mentioned above, a collection of cells which interact with each other is referred to as a colony, regardless of the physical location of the cells.

As illustrated in FIG. 1, cells 16, 18, and 20 are respectively responsive to a particular, locally perceived, external event 30, 32, 34. Examples of such events include keypad inputs, switch positions, ADC signals, etc. Thus, for example, a keypad event 30 is interpreted by the dispatcher 16e which triggers one or more scripts 16a–16d depending, for example, on which keys are pressed.

According to the example illustrated in FIG. 1, the cell 14 is a "network interface receiver" and is responsive to message events received via the external bus 28. In particular, if a cell in a remote node, e.g. 24, 26, executes a script which sends a message to a script in one of the cells in the node 22 it is received by the dispatcher 14e in the cell 14 and is forwarded to the appropriate script(s). An exemplary embodiment of a network interface receiver can be found in the Appendix at pages 45–57 (nicrx.c).

In the example illustrated, the dispatcher 14e executes scripts such as 14c which sends a message to a local external output device 36 and script 14d which sends messages to scripts 18b and 20a. The type of message which might be sent by script 14d includes messages which alert scripts 18b and 20a that a recipient of their respective messages is ready to receive messages.

The cell 12 shown in the illustrated example is a "network interface transmitter" and is responsive to a single script 12a which transfers messages from the node 22 to other nodes. An exemplary embodiment of a network interface transmitter can be found in the Appendix at pages 26–33 (nictx.c). The cell 12 is also responsive to clock signal events from a clock 38. In this example, the clock signal events cause the execution of script 12a which transmits messages according to priority to remote nodes via the bus 28. As described above, messages may be transmitted according to an event-reaction protocol or according to a streaming protocol. For example, as described in more detail below, scripts executed in cell 20 in response to input from an ADC 34 may generate streaming data which is communicated to a cell 12 for transmission to a remote node via the external bus 28.

Communications among scripts is preferably effected via structured communications packets of variable length which includes address information, an indication of the message type, an indication of the message length, and the message. A presently preferred packet structure is illustrated in Table 1 below.

TABLE 1

| Bytes | Content |
| --- | --- |
| 1 | total packet length in number of bytes |
| 1 | length in bytes of the recipient address field |
| 0–16 | list of recipient addresses |
| 2 | address of sender |
| 1 | message type |
| 1 | payload type |
| 1 | length in bytes of payload field |
| 1–64 | payload |
| 1 | checksum |

As shown in Table 1, in addition to having a variable payload length, the packet structure includes a variable field length for recipient addresses. According to the packet structure shown, each script has the capability of multicasting a message to up to eight other scripts, each having a two byte address. Indeed, as will be described in more detail below with reference to FIG. 5, according to preferred embodiments of the invention, scripts build mailing lists based on events such that the recipients of the messages generated by a particular script will change over time.

According to a presently adopted convention, messages are broadcast to all scripts by indicating that the length of the recipient address listing is 0, by not listing any recipient addresses, and by indicating the message type as being "broadcast". The presently preferred address format is two bytes where the first byte indicates the node where the script resides, three bits identify a "subnet", and five bits identify the script. In presently preferred embodiments, "subnet" refers to a single transport medium through which multiple nodes communicate. This addressing system provides the foundation for allowing groups of nodes in different networks to communicate with each other provided that there is some way to bridge the different networks. According to a presently implemented embodiment which is described in more detail below with reference to FIGS. 6 and 7 and the Appendix, the payload is limited to sixty-four bytes. Those skilled in the art will appreciate, however, that the maximum size of the payload depends in part on the type of application being implemented, the bandwidth of the network, as well as the latency which can be tolerated by the application.

According to the presently preferred embodiment, eight message types are defined. These include "broadcast", "exception", "remote process spawn", "remote process begun", "remote process ended", "data event", "data event acknowledge", and "stream". The payload types presently defined include "unsigned character", "signed character", "unsigned integer", "signed integer", "$\mu$-law encoded", "wave encoded", and "MPEG encoded". The message type field is used by queue managers to dispense rank tokens in order to prioritize packets. Further, the message type field may be used by scripts to determine whether the receiving script is intended to operate in either a "master mode" or a "slave mode".

Figure 2:
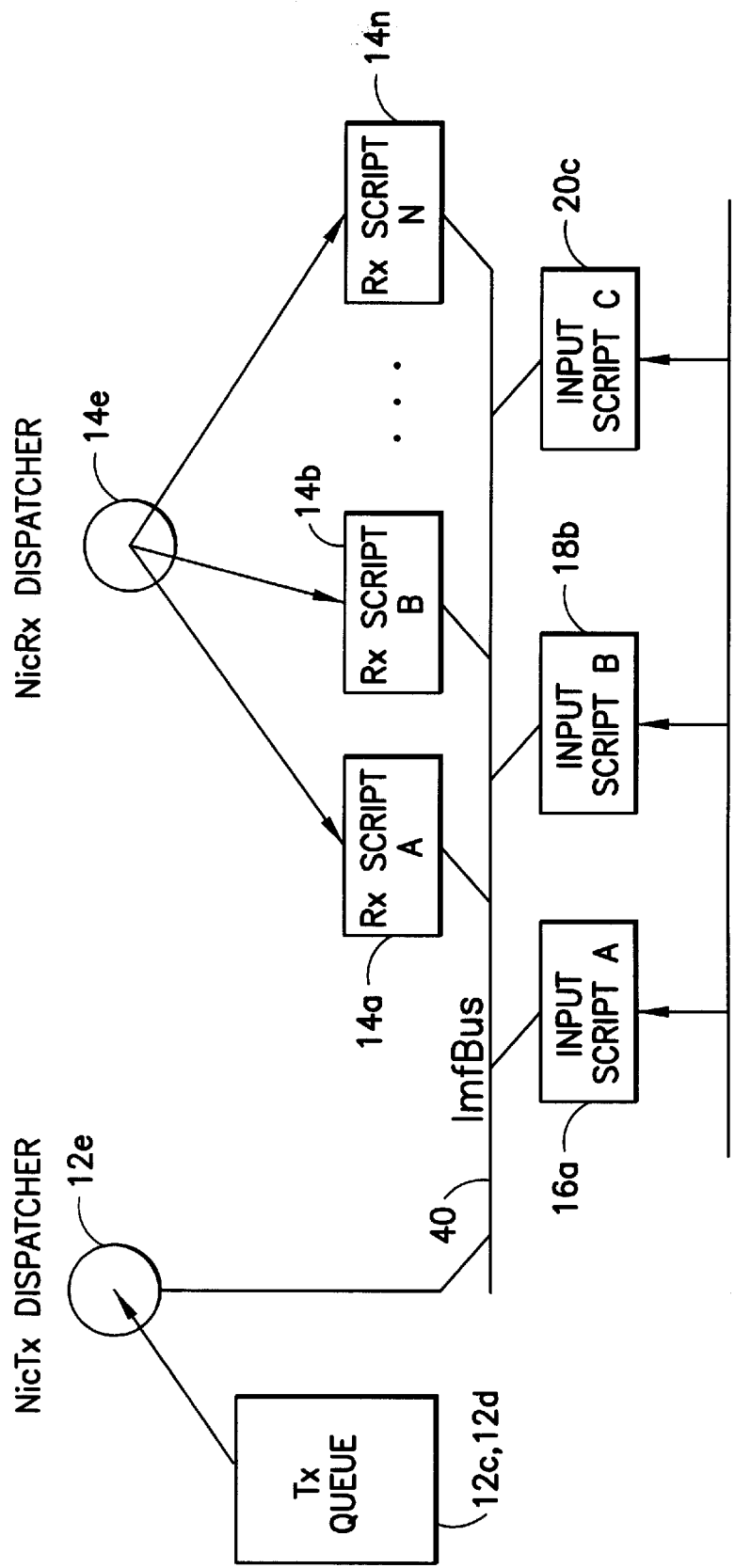
FIG. 2 is a high level schematic diagram illustrating the lines of communication among scripts in a processing system according to the invention.
Figure 3:
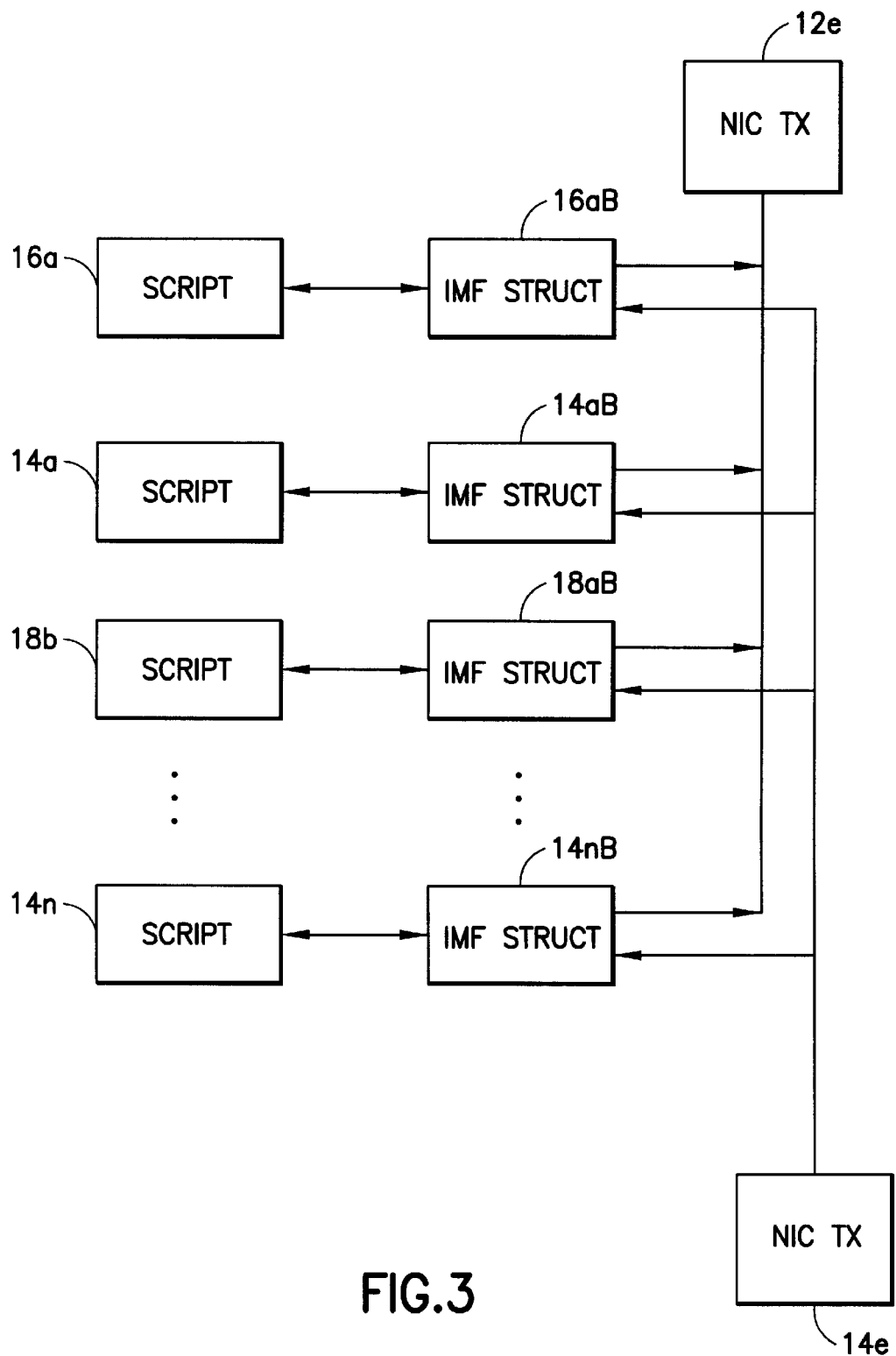
FIG. 3 is a high level schematic diagram of the buffering of messages between scripts and the network interface cells.

Turning now to FIGS. 2 and 3, each script in a node is coupled to a "local bus" 40. For purposes of this description, the "local bus" 40 is referred to as the Imf (internal message format) bus and in a presently preferred embodiment it is embodied as a multiported shared memory. If a shared memory is not used, it is preferred that the Imf be provided with buffers for inter-cell communications within a node and inter-node communications. Regardless, each script which has a need to output a message through the network interface transmitter 12 or receive a message from the network interface receiver 14 is provided with a buffer for inter-node communications. Each buffer is presently embodied as an instance of a data structure (e.g. 16aB, 14aB, 18aB, 14nB, etc. in FIG. 3) which includes routing information for the network interface transmitter and receiver, feedback to the sending script about the status of the receiving script's state, and any information which may have been returned by the receiving script. In addition, the buffer includes all information needed for the network interface transmitter dispatcher 12e to packetize the outgoing message and for the network interface receiver dispatcher 14e to route the incoming message. Thus, messages entering a node through the network interface receiver dispatcher 14e are automatically routed by the network interface receiver via a function call to a pointer which points to a script in an "IMF STRUCT" array associated with the network interface receiver. These arrays are defined throughout the Appendix and called "Scripts [ . . . ]". Moreover, automatic responses to messages such as spawn process requests are similarly created. A high level description of how the network interface receiver and transmitter utilize these buffers is illustrated in the flow charts of FIGS. 4 and 5.

Referring now to FIG. 4, when a message is received by the network interface receiver, after examining the message contents and checksum, the node and subnet address information is extracted at 100. The script address is read at 102. According to a presently preferred embodiment, the script address points to a pointer in the IMF struct. The IMF struct is read at 104 and the pointer to the script is obtained. Using this pointer the actual script is found at 106. The remaining information in the message is passed to the script at 108. If the message is the type which requires a reply, the reply info is obtained from the script at 110 and the previously extracted address info is used at 112 to return the reply to the sending script. Other details of a network interface receiver according to the invention can be gleaned from the source code listing "nicrx.c" in the Appendix at pages 45–57.

Turning now to FIG. 5, messages leaving the node via the network interface transmitter are processed according to a queue. The queue contains pointers to the buffers (e.g. the IMF STRUCTs in FIG. 3) containing outgoing messages. The pointer to the next message is read from the queue at 200 and the message type is read from the buffer at 202. The address length and address fields are adjusted according to the message type at 204. For example, if the message type is broadcast, the address length field is set to zero and no addresses are listed. Similarly, if the message type is a data event ack, the address length will be two bytes since these messages always have one receiver. However, if the message type is a data event or a stream, there may be many addresses. According to the presently preferred embodiment, data events require acks and the acks are used to update mailing lists, but streams do not require acks. If the message type requires a response, ack flags are set at 206 so that when acks are received they will be registered as described above. At 208, the packet with the checksum is constructed and at 210 the transmitter is informed that a new message is ready to be sent. According to the presently preferred embodiment, the constructed packet is held in a buffer and a pointer to the buffer is held in the output message queue. This constitutes the basic handling of messages by the network interface transmitter. Other details of a network interface transmitter according to the invention can be gleaned from the source code listing "nictx.c" in the Appendix at pages 21–33. As will be seen in the Appendix, the output message queue is presently limited to eight IMFstruct pointers.

As mentioned above, according to the invention, scripts may communicate with each other by dynamically compiling and tearing down mailing lists which are based on the occurrence of specific events. For example, with reference to the general discussion regarding FIGS. 1–5, one of the byproducts of a remote process spawn message may be the updating of a "mailing list" which is referenced by data event messages and stream messages. Also, as mentioned above, according to another preferred aspect of the invention, cells periodically advertise their presence in the network so that other cells can take advantage of their resources. For example, with reference to the general discussion regarding FIGS. 1–5, cells or nodes may be programmed to periodically send broadcast type messages to announce their presence in the network and their capabilities. The cells or nodes would also then be programmed to interpret such broadcast messages and update mailing lists and databases based on these messages.

Figure 6:
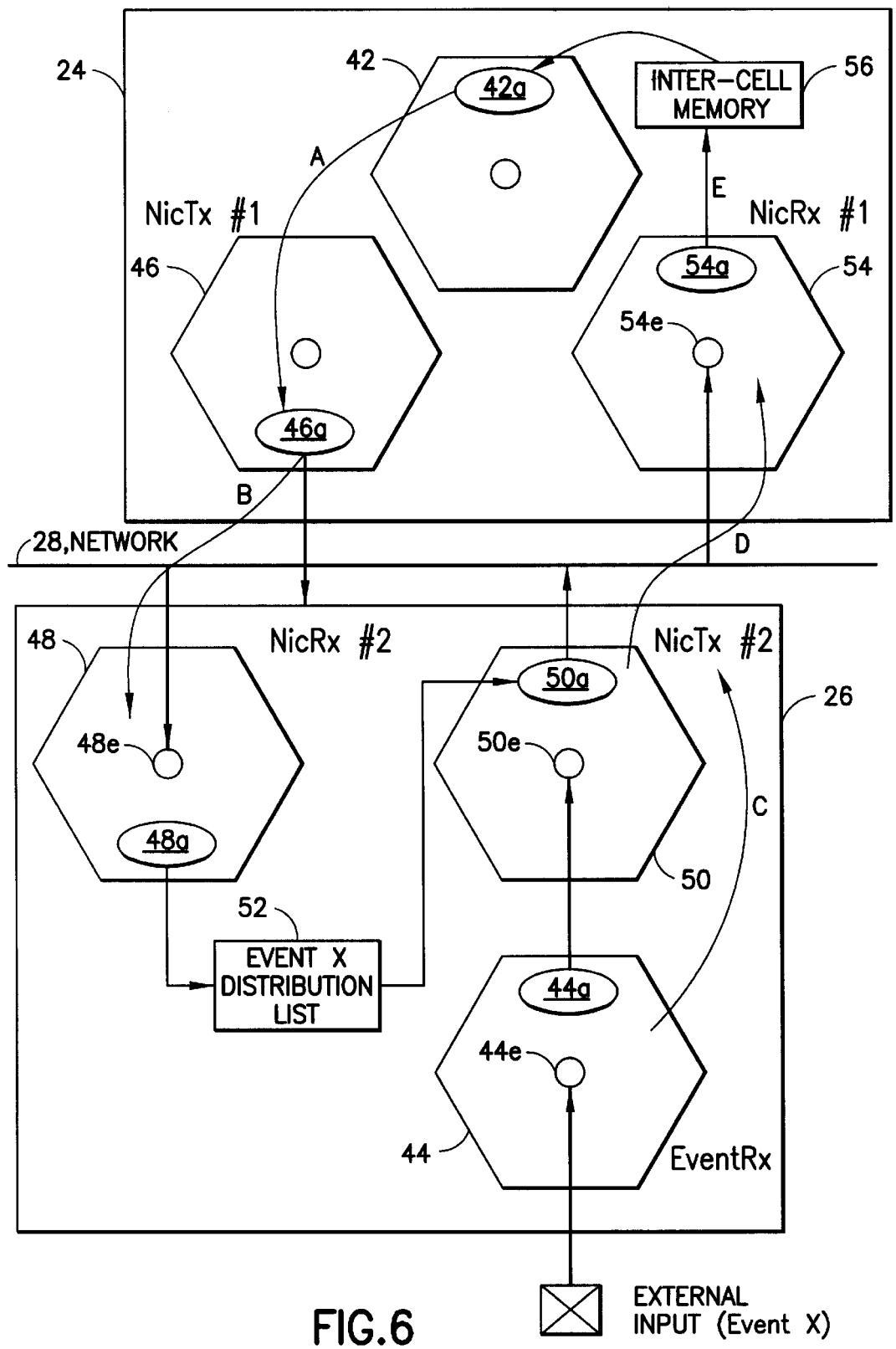
FIG. 6 is a high level schematic diagram illustrating the flow of messages from cells across the network to other cells.

An example of messages exchanged in response to an advertisement from a cell is illustrated with reference to FIG. 6. As illustrated in FIG. 6, the cell 42 in node 24 learns from an advertisement that the cell 44 in node 26 is now connected to the network and is functioning. From its own programming and the advertised information, the cell 42 knows that the cell 44 is responsive to input which is useful to the activity of cell 42. In response to this information, the script 42a in cell 42 creates a "remote process spawn" message which is directed to the script which manages the mailing list of cell 44. The spawn process message is a directive to add addresses to the mailing list of scripts in the cell 44. The message flows via the local bus (not shown) to the network interface transmitter cell which transmits the message via script 46a onto the network 28.

Once the message is transmitted onto the network it is seen by all network interface receiver cells which are coupled to the network. The "to address" in the message is read by all receivers including the network receiver 48 in node 26. Based on the address and the message and the message type, the dispatcher 48e in cell 48 executes script 48a which is responsible for managing the mailing list 52 of the cell 44. The mailing list 52 resides in shared memory or in a buffer dedicated to that purpose. Preferably the mailing list resides in a buffer which is only visible to the cells involved. The script 48a reads the message from script 42a, determines that the message is intact, checks the mailing list 52 to determine whether the "new subscriber(s)" is already on the list and updates the mailing list 52 if needed. Based on a recognition of the message type, the script returns a message to script 42a that the remote process is ended. The "remote process ended" message includes error indications if any errors were encountered during execution of the process. The update mailing list is a fast process and, as such, does not require the "remote process begun" response. In the case of processes which take longer times to complete, the script performing the remote process preferably will respond that the process has begun and will respond again that the process is ended.

When the event "X" occurs at the input cell 44, the dispatcher 44e calls script 44a which sends a message to the network interface transmitter 50. The cell 44 may process the event first or may simply call the script 44a to notify the transmitter. For example, if the cell 44 is a keypad controller, it will "process" the event "X" to determine which key has been pressed prior to calling the script 44a. The message sent by 44a will include the results of the processing, i.e. an indication of which key was pressed. Alternatively, if the external input to the cell 44 is one bit binary such as an on/off switch, the script 44a may always send the same message, i.e. switch has changed state, may be hard coded to do so, and thus may simply be called without first processing the event "X". The dispatcher 50e in the transmitter 50 recognizes that the type of message is a data event and calls the script 50a which gets the mailing list from the data structure 52 (based in part on the from address) in order to format the message for a multicast transmission onto the network 28. When the message is sent by script 50a, the script also enters information in the buffer (not shown here, but see FIG. 3) associated with the cell 44. The information includes an indication that data was sent to the members of the mailing list. This information will later be used to be sure that the data was received intact within the allocated time frame, i.e. to determine whether the data needs to be resent to one or more recipients.

The message from the transmitter 50 is found on the network 28 by all of the receivers coupled to the network. All of the receivers read the node information in the address list to determine whether any cells in their respective nodes contain affected scripts. For example, if the address contains the node, the dispatcher 54e in the network interface receiver 54 routes on the script address to call the appropriate script 54a to process the message. The script 54a may be designed to take the data payload of the message and store it at a location in the shared memory 56 of the node 24. Alternatively, the script 54a may be designed to take the data payload of the message and store it at a location in the shared memory 56 and also call another script which will read the data from shared memory and make use of it.

The example illustrated in FIG. 6 illustrates the symmetrical/reciprocal nature in which the cells function. In this example, a cell in node 24 began by spawning a process in node 26 to add its address to the distribution list of a cell in node 26. In this manner, the cell in node 24 was acting as a "master" and the cell in node 26 was acting as a "slave". Later, when the "event X" cell detects the event X, the event X cell in node 26 acts as a master and the cell(s) in node 24 act as slave(s). This is markedly different from classical multi-processing systems where one processor always acts as the instigator of activities.

The general description of processing systems described above may be better understood with reference to a specific application of the system (although it is not limited thereto). A prototype application has been developed implementing the architecture described generally above in a telephone private branch exchange (PBX) in which cells are distributed over "line cards" and "phone cards" which couple several telephone sets to one or more telephone subscriber lines.

Figure 7:
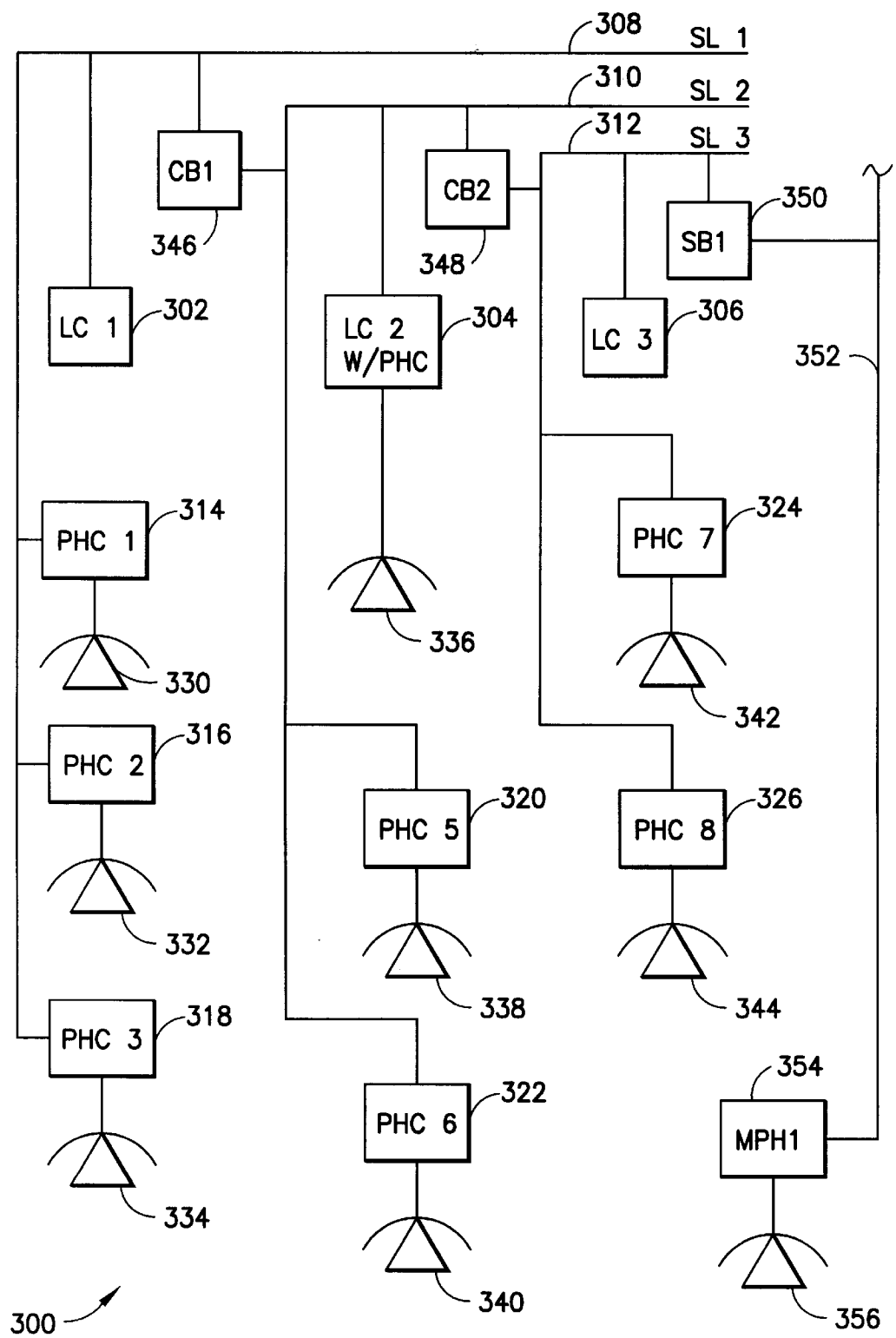
FIG. 7 is a high level schematic diagram of a distributed processing system according to the invention illustrated with reference to a telephone private branch exchange (PBX)

Turning now to FIG. 7, a distributed processing system 300 according to the invention is embodied as a telephone private branch exchange (PBX). The system 300 includes a plurality of line cards 302, 304, 306, each of which is coupled to a separate subscriber line 308, 310, 312 and a plurality of phone cards 314, 316, 318, 320, 322, 324, 326, each of which supports one telephone set or similar device 330, 332, 334, 338, 340, 342, 344. According to the presently preferred embodiment, the line cards and the phone cards are each powered by their own power supply which is an AC adaptor coupled to the AC mains of a home or office. The line cards 302 and 306 are coupled to their respective subscriber lines 308 and 312, but are not coupled to anything else. The line card 304 is a hybrid line card/phone card and is coupled to subscriber line 310 as well as to telephone set 336. The phone cards 314, 316, 318 are each coupled to the subscriber line 308 and, as explained in more detail below, are able to communicate with each other and with the line card 302 by sending signals over the subscriber line 308 wires. The phone cards 320 and 322 are coupled to the subscriber line 310 and, as explained in more detail below, are able to communicate with each other and with the hybrid card 304 by sending signals over the subscriber line 310 wires. Phone cards 324 and 326 are coupled to the subscriber line 310 and, as explained in more detail below, are able to communicate with each other and with the line card 306 by sending signals over the subscriber line 312 wires. In order for cards coupled to subscriber line 308 to communicate with cards coupled to subscriber line 310, a bridge 346 is provided and coupled to both subscriber lines 308 and 310. The bridge 346 allows signals generated by the cards to be received over both subscriber lines but does not couple the subscriber lines in a way which would interfere with their use in the telephone network. Similarly, subscriber lines 310 and 312 are coupled by a bridge 348 which allows the cards coupled to subscriber line 312 to communicate with the cards coupled to subscriber lines 308 and 310. According to a preferred aspect of the invention, the network may be bridged over different media. For example, using a bridge 350, the network can be expanded onto the AC mains 352. It will be understood that on the mains medium, a slightly different interface will be required for the phone card 354 which coupled telephone set 356 to the entire PBX 300. According to the presently preferred embodiment of the invention, bridging of like media is done with a capacitive or inductive bridge and bridging of dissimilar media is done with a "smart bridge". It will be appreciated, however, that a smart bridge could be used to bridge like media as well.

Applying the general description of FIGS. 1–6 to the example of FIG. 7, each of the line cards and phone cards may be thought of as a separate node and the bridged subscriber lines and AC mains may be thought of as the network bus 28 shown in FIGS. 1 and 6. The cells in each line card include a cell which responds to events occurring on its associated subscriber line, i.e., an incoming phone call. Scripts responding to an incoming phone call include ring detection, ring mailing list, and caller ID mailing list. Other scripts which respond to scripts from the phone cards include line seize, dial, and speech mailing list. The ring mailing list and the caller ID mailing list indicate which phone cards will receive a ring signal and caller ID information when a ring is detected on the subscriber line by the line card. The line seize and dial scripts respond to messages from a phone card when certain scripts in the phone card are executed. The speech mailing list scripts which exist on both the phone cards and the line cards control the delivery of streaming digitized sound.

The phone cards each include scripts which respond to events generated by the attached telephone set and to messages received from the other cards in the network. For example, the phone cards include scripts for generating a dial tone when the attached telephone set goes off hook, for registering DTMF tones, for sending messages to other cards in the system, etc.

The attached Appendix includes code for implementing line cards and phone cards. The code which is particular to the line cards is identified by file names which begin "psn/1c" can be found in the Appendix at pages 60 through 87. The code which is particular to the phone cards is identified by file names which begin "phone/" and can be found at pages 87 through 173 of the Appendix. Code which is used by the system generally and by both the phone cards and the line cards is found in the Appendix at pages 3 through 60.

Figure 8:
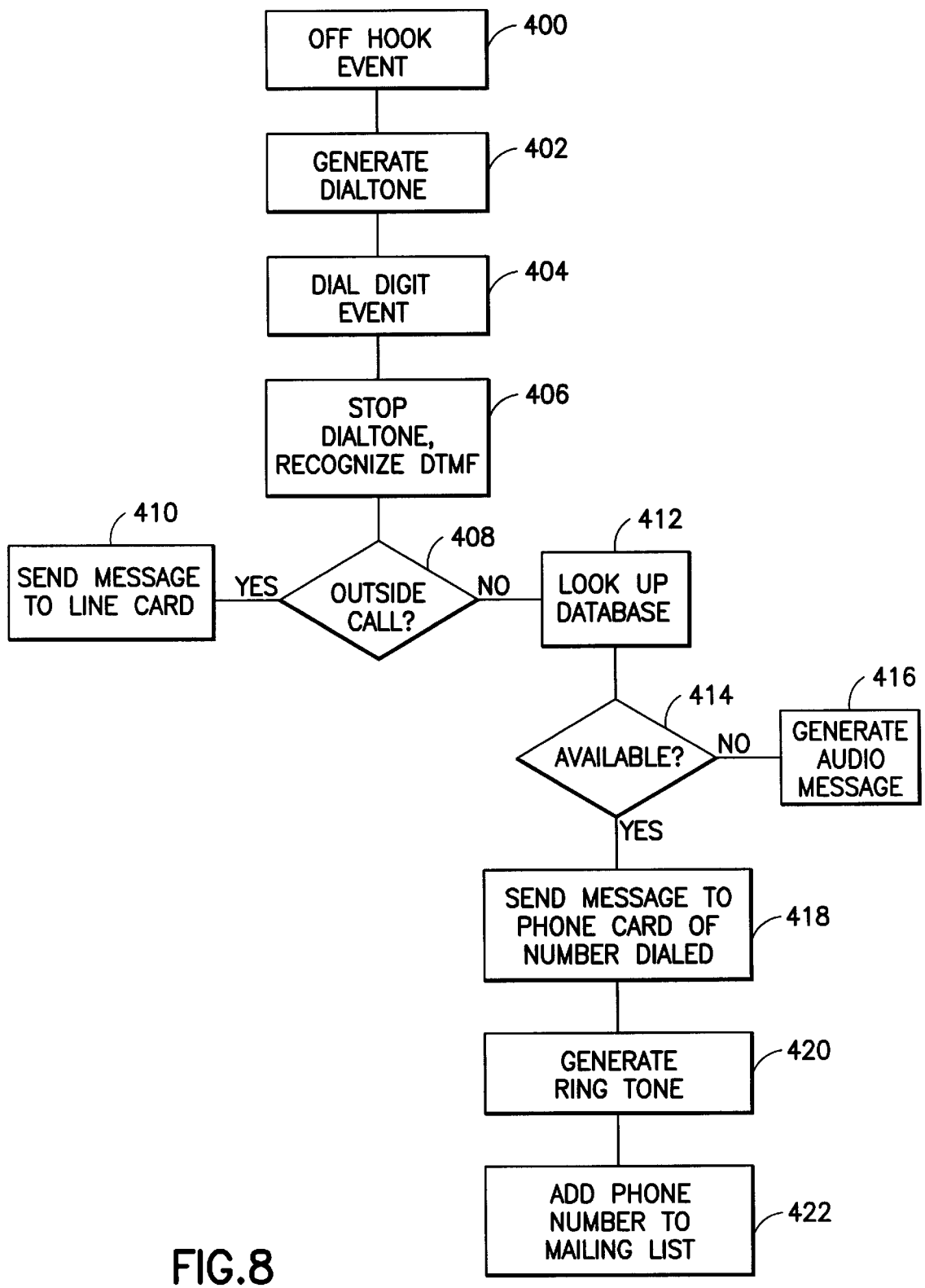
FIG. 8 is a simplified flow chart illustrating a simple operation of the PBX of FIG. 7.

For example, when the telephone set 332 goes off hook, the off hook event causes a series of scripts to be executed in the phone card 316 which generate a dial tone for the telephone set 332. When a digit is dialed, another script is executed to register the DTMF tones, etc. FIG. 8 illustrates some of the functions of the PBX system 300.

Turning now to FIG. 8, when a telephone set attached to one of the phone cards in the system goes off hook, an "off hook event" is detected by a cell in the phone card and this is indicated at 400 in FIG. 8. This event is also illustrated in the Appendix at pages 82 et seq. Given the parameters of the network bandwidth and the number of cards attached to the network, it is possible that there will not be enough bandwidth available to service the telephone set and the phone card will generate a busy signal. Otherwise, the phone card will generate a dial tone as indicated at 402 in FIG. 8 and as also shown in the Appendix at pages 159 et seq. It will be appreciated from the Appendix that the dial tone heard in the telephone set is not the dial tone generated by the public telephone network but is a tone generated by a cell in the phone card. See Appendix pages 41–42. However, it will be appreciated that the telephone network dial tone could be used. The telephone set will next generally generate a DTMF tone in response to a user pressing a key on the keypad. When this occurs a "dial digit event" is detected by a cell in the phone card as indicated at 404 in FIG. 8 and in the Appendix at pages 64 et seq. The cell which detects DTMF tones coming from the telephone set includes scripts for time out limits between digits, a script for stopping the generation of dial tone (406 in FIG. 8) and scripts for recognizing which DTMF digits were dialed.

According to a preferred embodiment, the PBX system allows calls to be made between phones in the local network without using the public telephone network. Thus, the DTMF cell in the phone card will contain scripts to interpret whether the digits dialed represent an outside call which requires the use of a subscriber line. This determination is illustrated at 408 in FIG. 8 and in the Appendix at pages 141 et seq. If the call needs an "outside line", messages are sent from the phone card to the line card(s) as illustrated at 410 in FIG. 8. These messages include a request to seize a line and a request to dial the number corresponding to the digits dialed by the telephone set. See Appendix pages 101–104 (request to seize a line) and pages 117 et seq. (request to dial digits). Though not illustrated in FIG. 8, it will be appreciated that these messages to the line card are remote process spawn events which require a response from the line card. Thus, as seen in the Appendix at pages 81 et seq., the line card seizes a subscriber line and dials the DTMF tones. In addition, streaming data will be sent from the phone card to the line card and vice versa for the sound/speech of the telephone call. Each card has a speech cell and, as shown in the Appendix at pages 71 et seq. (line card) and 93 et seq. (phone card), the speech cells each have a mailing list which is edited whenever a connection between phones is made. From the foregoing and the Appendix, it will be appreciated that conference calls are easily enabled via the use of mailing lists. See, e.g., Appendix pages 51–55 and 93 et seq.

Returning now to FIG. 8, if it is determined at 408 that the number dialed is a local network number, e.g. an extension number, a script is executed (412 in FIG. 8) to look to the network database to determine if there is a phone card responding to that extension number connected to the network. See Appendix pages 141 et seq. If no such number exists as determined at 414 in FIG. 8, a speech generating script is called to generate an audio message at 416 in FIG. 8 which is heard in the hand set of the telephone. According to the presently preferred embodiment, speech generation tools are used throughout the system to generate "recorded" messages. See, e.g., Appendix pages 137 et seq. which shows how messages are constructed by concatenating prerecorded words and phrases.

If it is determined at 414 in FIG. 8 that the dialed extension exists, a message is sent at 418 in FIG. 8 to the phone card having the extension number dialed. This is also illustrated in the Appendix at pages 142 et seq. If the phone connected to the dialed phone card is not off hook, a script in the dialing phone card will generate a ringing tone in the handset of the dialing telephone. This is illustrated at 420 in FIG. 8 and in the Appendix at page 143. Meanwhile, a script will send a message to the dialed phone card instructing it to make the phone attached to it ring. The dialed phone card will return information indicating whether the dialed phone has picked up. Though not shown in FIG. 8, this is illustrated in the Appendix at 122 et seq. Once the telephone being called has gone off hook, the ringing is stopped and the mailing lists for the speech streaming messages on both phone cards are updated. This is generally shown in the Appendix at pages 93 et seq.

Though not illustrated in FIG. 8, it can be easily appreciated from the Appendix that whenever either the caller or the called hangs up, a message is sent to update the mailing lists of the two phone cards, i.e. to remove the addresses of each phone card from the mailing list of the other with regard to speech streams. See, e.g., Appendix at pages 170 et seq.

From the forgoing, those skilled in the art will appreciate that the PBX system described above may also be adapted to network other types of data in addition to or in lieu of telephone calls. For example, given the principles of the invention, it is possible to adapt the PBX network described above to also carry serial data streams from a personal computer to a printer, for example. This is also suggested in the Appendix at pages 35, 138, and 156. Moreover, it is possible to create phone cards which also have serial and/or ETHERNET ports so that the home subscriber line(s) wire (s) can be used for data networking.

In addition, it is easy to realize, given all of the above disclosure that the invention may also be adapted to carry various types of home automation, home security, and home entertainment data. For example, other processing colonies according to the invention can be coupled to the home network (either telephone wires or AC mains, or even cable tv wires) with or without the PBX system. These other processing colonies can include video transmitters and receivers for both security and entertainment, multiple digital sound channels for security and entertainment, simple signal controls to turn appliances on and off in response to events for both home automation and home security, etc. Though not yet fully implemented, it will be appreciated that the invention can achieve remarkable efficiency through the application of "space-time" programming where time is included in the declaration of variables and functions.

There have been described and illustrated herein several embodiments of a distributed processing system incorporating a plurality of cells with each cell being responsive to a type of event. While particular embodiments of the invention have been described, it is not intended that the invention be limited thereto, as it is intended that the invention be as broad in scope as the art will allow and that the specification be read likewise. Thus, while particular a particular embodiment has been disclosed with reference to software, it will be appreciated that the invention may be embodied in software, hardware, or combinations of software and hardware. It will therefore be appreciated by those skilled in the art that yet other modifications could be made to the provided invention without deviating from its spirit and scope as so claimed.

What is claimed is:

1. A distributed processing system, comprising:
   a first plurality of processing cells, each cell being responsive to an event and each cell including at least one executable script which is executed upon the occurrence of the event; and
   a first communications means coupled to each of said cells in said first plurality of cells for exchanging messages between cells, wherein
   at least one of said processing cells includes an executable script which periodically advertises its presence in the system such that when said at least one of said processing cells is added to the system, it advertises its presence to the other processing cells in the system.

2. A distributed processing system according to claim 1, further comprising:
   a second plurality of cells; and
   a second communications means coupled to said first and second pluralities of cells for exchanging messages between said first and second pluralities of cells, wherein
   at least one of said cells in said first plurality of cells periodically advertises the presence of said first plurality of cells in the system, and
   at least one of said cells in said second plurality of cells periodically advertises the presence of said second plurality of cells in the system.

3. A distributed processing system according to claim 2, wherein:
   said second communications means includes a transmitter cell and a receiver cell.

4. A distributed processing system according to claim 3, wherein:
   said transmitter cell includes a queue manager script.

5. A distributed processing system according to claim 1, wherein:
   at least some of said first plurality of cells acts as master to one process and a slave to another process.

6. A distributed processing system according to claim 1, wherein:
   each cell in said first plurality of cells periodically advertises its presence in the system.

7. A distributed processing system according to claim 2, wherein:
   each cell in said second plurality of cells periodically advertise their presence in the system.

8. A distributed processing system according to claim 1, wherein:
   each cell maintains a database of all of the scripts in the system.

9. A distributed processing system according to claim 8, wherein:
   each cell periodically advertises its presence in the system, and
   said databases are updated in response to advertising by said cells.

10. A distributed processing system according to claim 4, wherein:
    said queue manager manages data transfer according to an event reaction protocol requiring that receipt of data be acknowledged.

11. A distributed processing system according to claim 10, wherein:
    said queue manager also manages data transfer according to a streaming protocol in which receipt of data is not acknowledged.

12. A distributed processing system according to claim 11, wherein:
    said queue manager has means for determining which data to transfer according to a streaming protocol and which data to transfer according to an event reaction protocol.

13. A distributed processing system according to claim 4, wherein:
    said queue manager manages data transfer according to mailing lists.

14. A distributed processing system according to claim 13, wherein:
    said mailing lists are subscribed to by scripts.

15. A distributed processing system according to claim 13, wherein:
    said mailing lists are subscribed to by cells.

16. A distributed processing system, comprising:
    a) a plurality of processing zones, each processing zone being responsive to an event and each processing zone executing at least one script in response to the event;
    b) communication means coupled to each of said processing zones for exchanging messages between processing zones, wherein
    at least one of said processing zones includes a script which periodically advertises its presence in the system such that when said at least one of said processing zones is added to the system, it advertises its presence to the other processing zones in the system.

17. A distributed processing system according to claim 16, wherein:
    said communication means includes a multiported shared memory.

18. A distributed processing system according to claim 16, wherein:
    at least one of said processing zones includes means for coupling itself to a peripheral device.

19. A distributed processing system according to claim 16, wherein:
    at least one of said processing zones includes means for coupling itself to a network.

20. A distributed processing system according to claim 19, wherein:
    at least one of said processing zones includes a script which periodically advertises the presence of said plurality of processing zones in the system.

* * * * *